July 21, 1964 — N. A. BOLTON — 3,141,612
BI-DIRECTIONAL MULTIPLE LANE VEHICLE REGISTERING SYSTEM
Filed Jan. 16, 1961 — 8 Sheets-Sheet 1
FIG. IA.
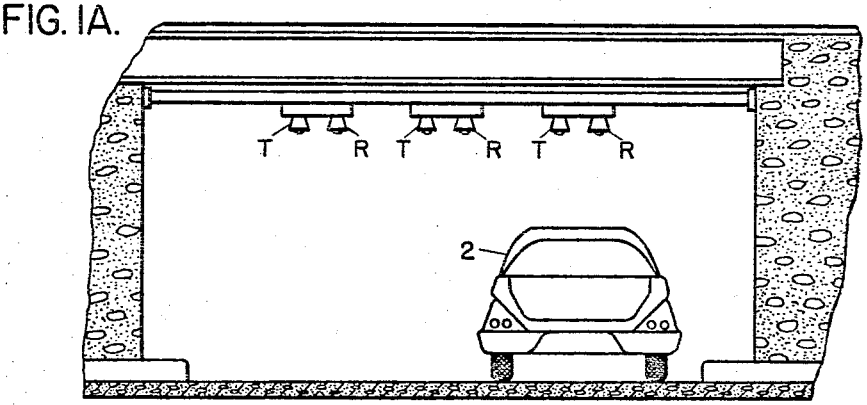
FIG. IB.
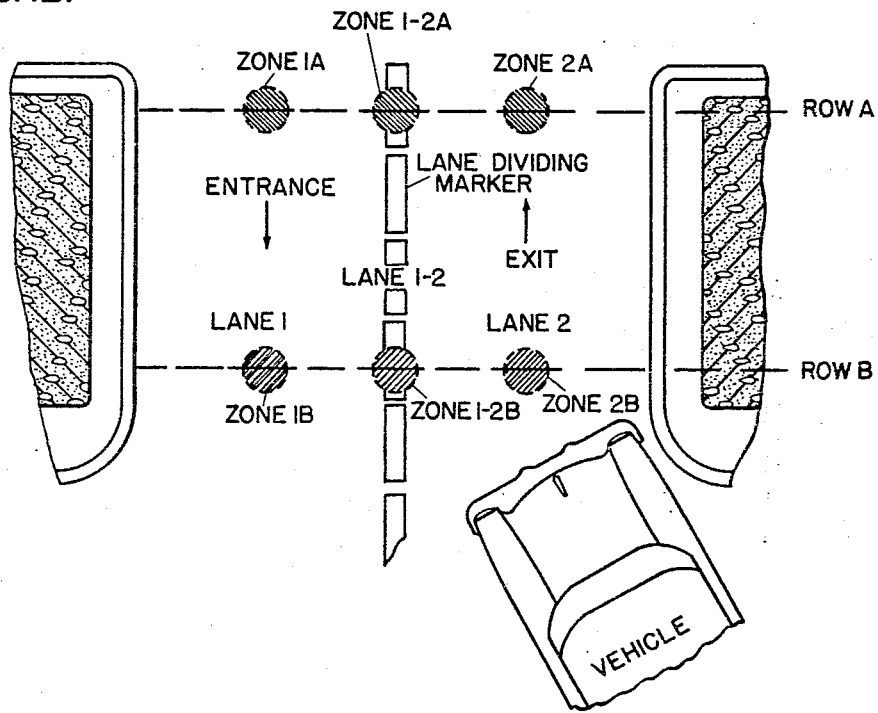
INVENTOR.
N. A. BOLTON
BY
*Forest B. Hitchcock*
HIS ATTORNEY

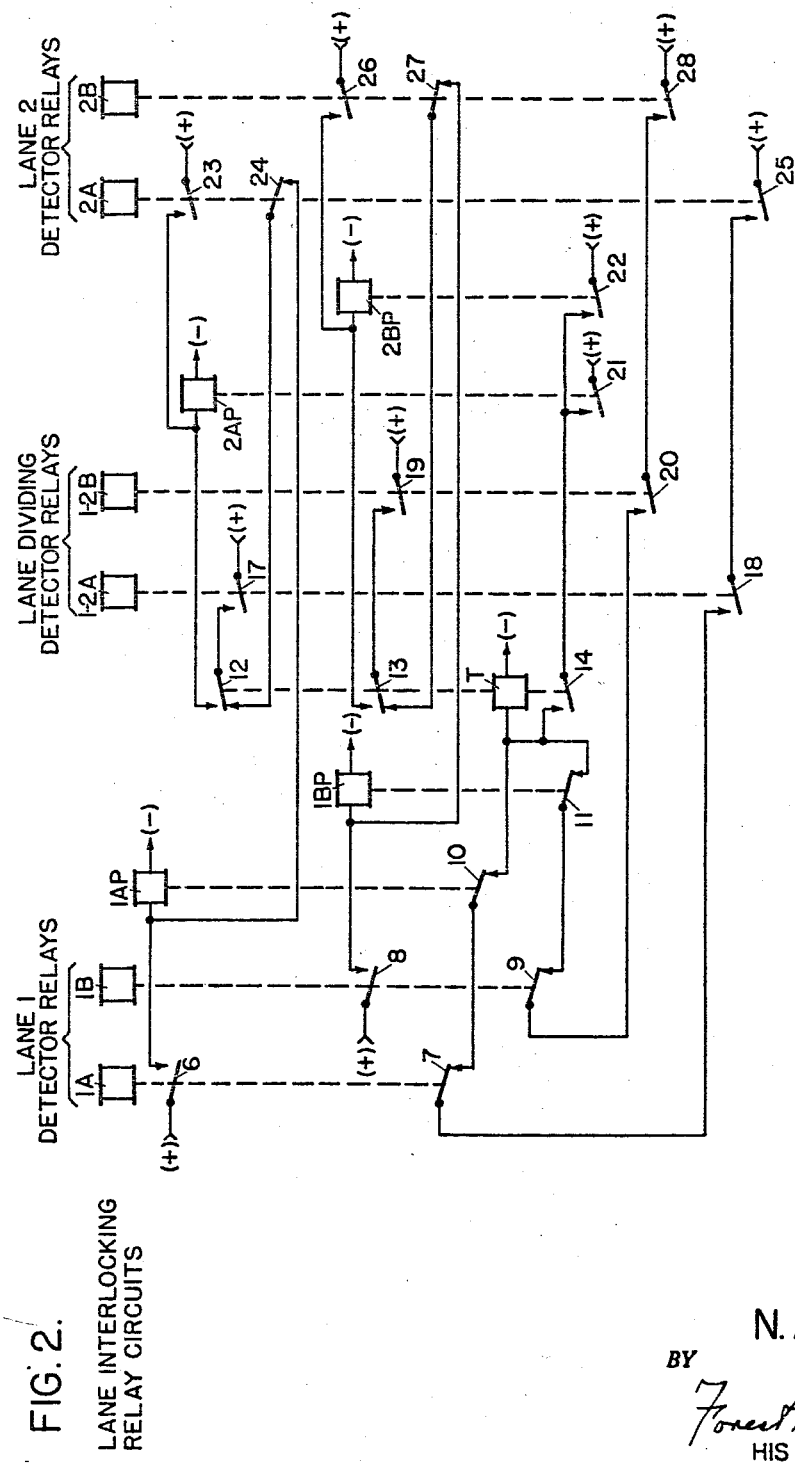

INVENTOR.
N. A. BOLTON
BY
HIS ATTORNEY

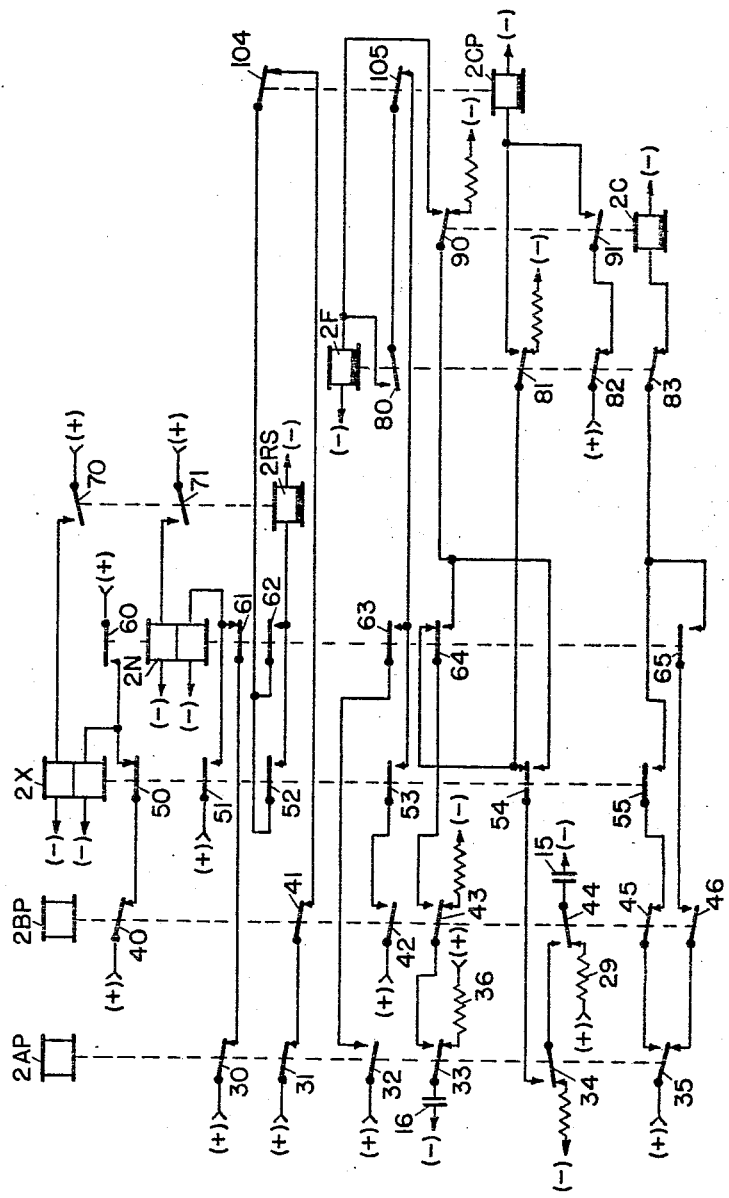
FIG. 4. COUNT PULSE CONTROL CIRCUITS

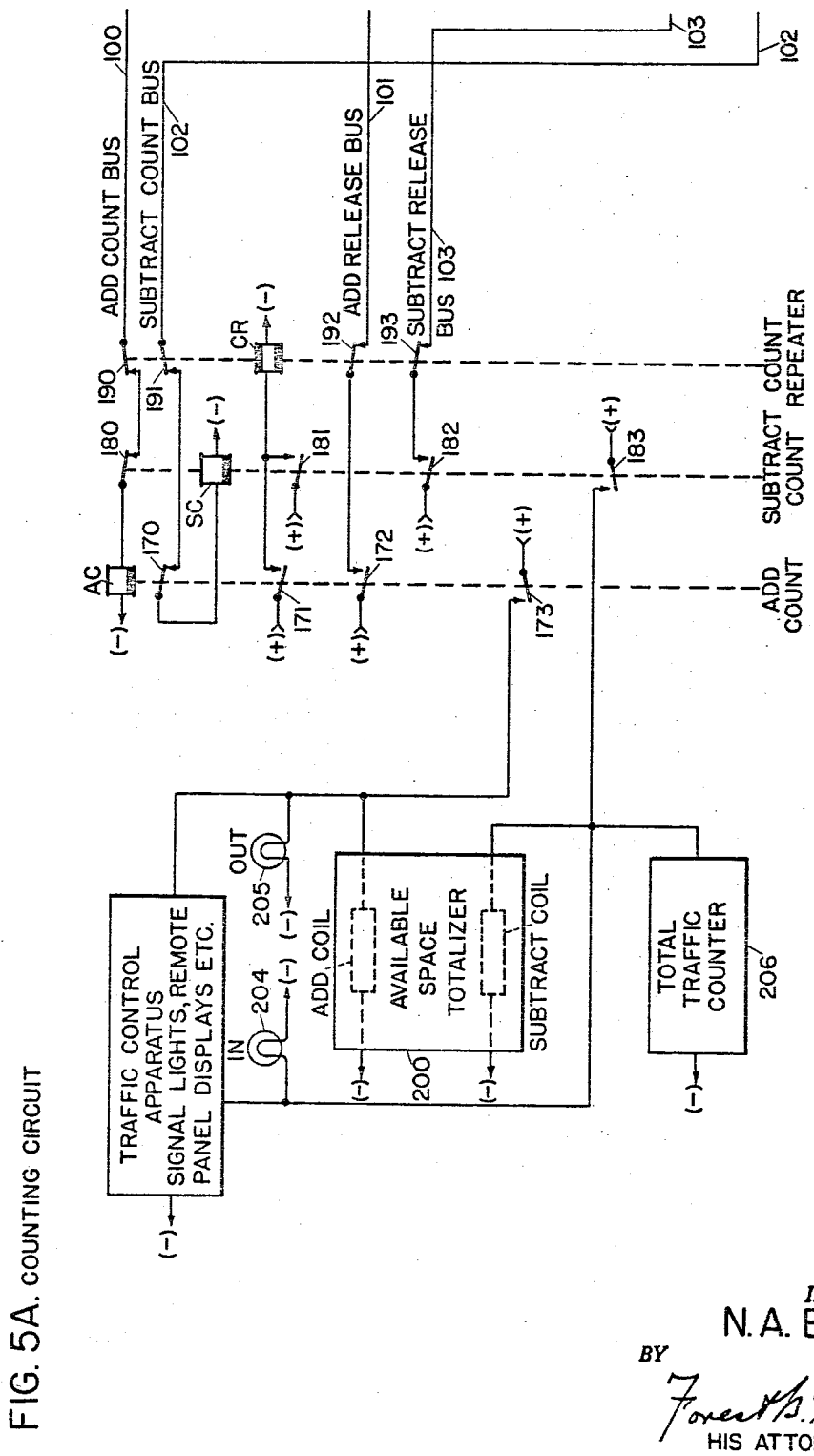
FIG. 5A. COUNTING CIRCUIT

INVENTOR.
N. A. BOLTON
HIS ATTORNEY

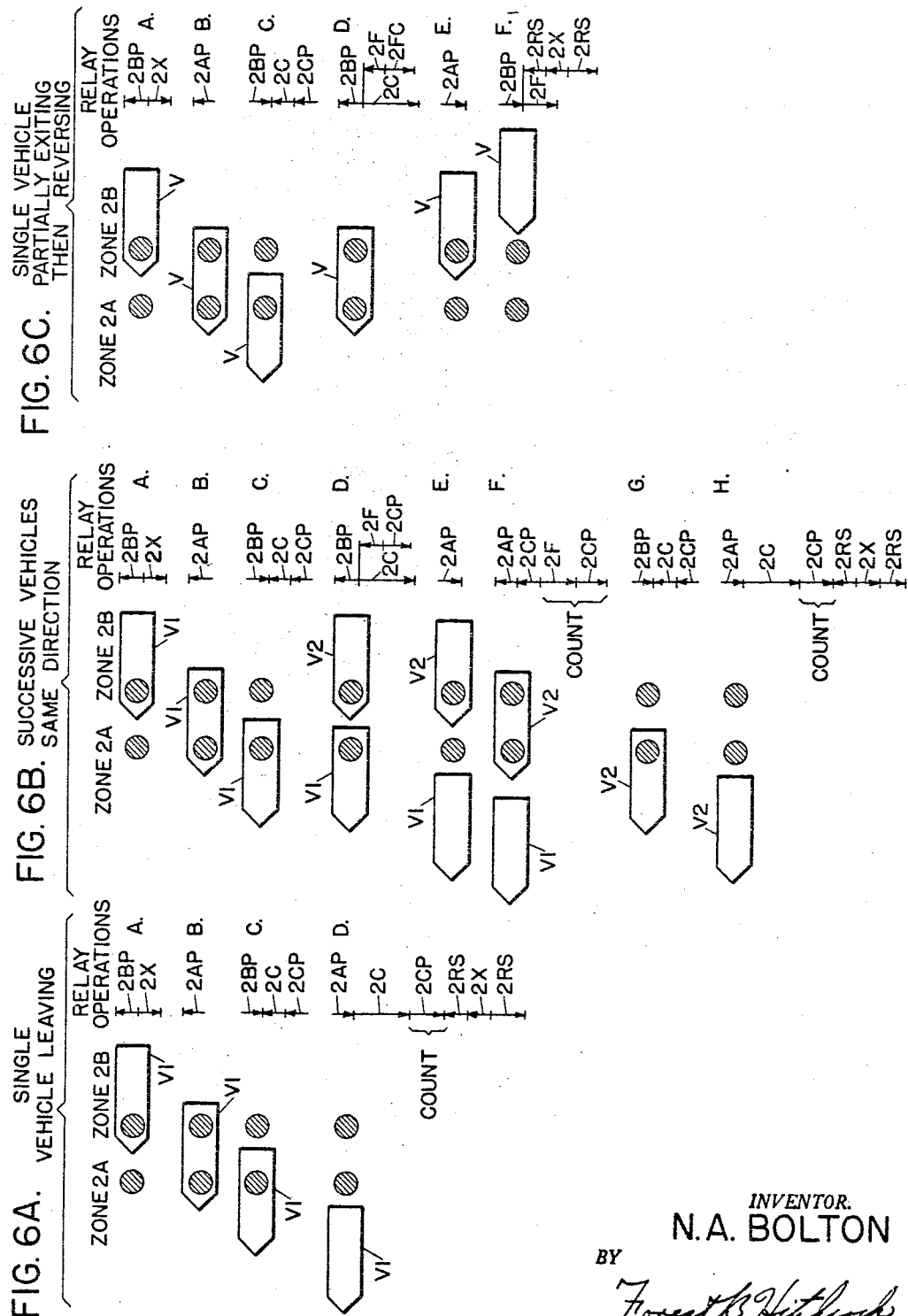

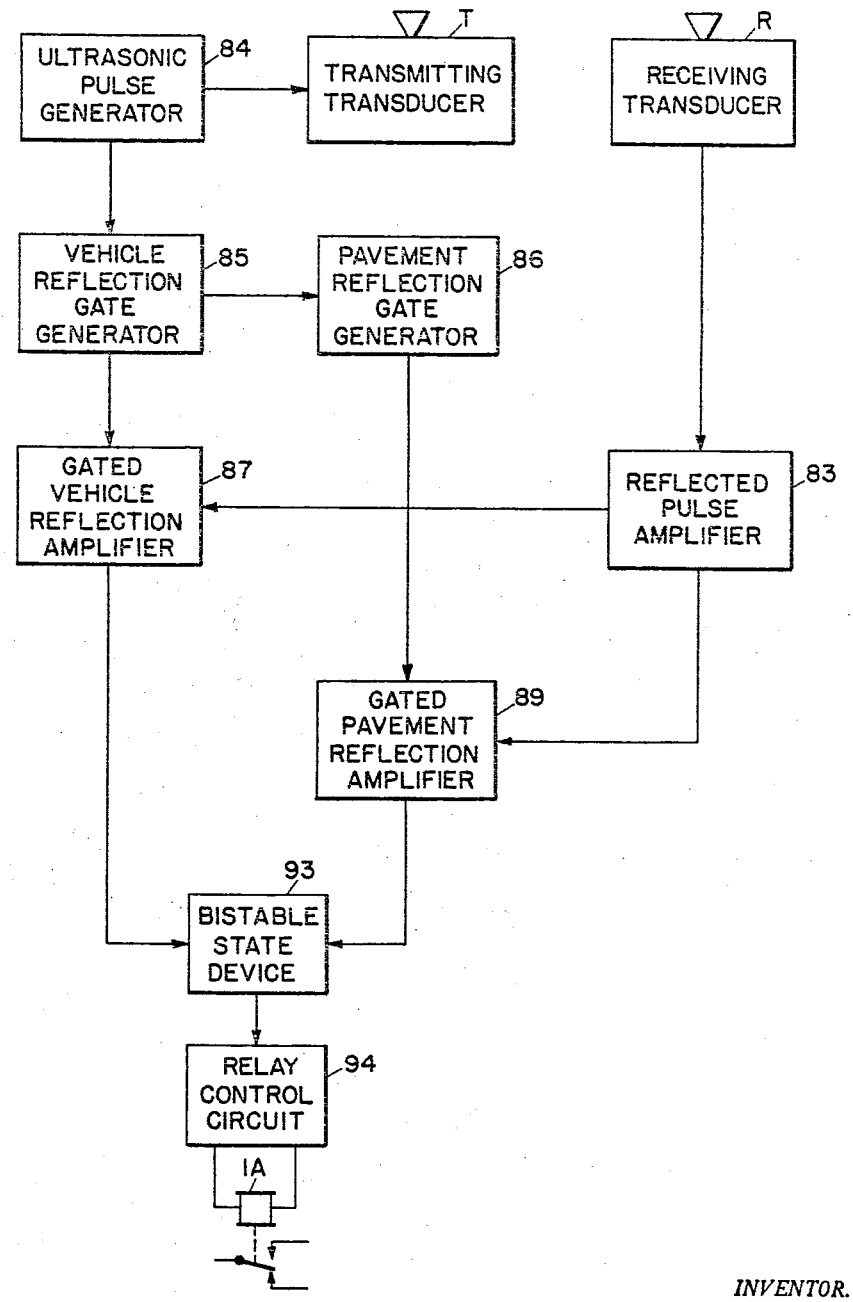

United States Patent Office 3,141,612
Patented July 21, 1964

3,141,612
BI-DIRECTIONAL MULTIPLE LANE VEHICLE
REGISTERING SYSTEM
Norman A. Bolton, Scottsville, N.Y., assignor to
General Signal Corporation
Filed Jan. 16, 1961, Ser. No. 82,903
11 Claims. (Cl. 235—99)

This invention relates to the selective detection of vehicles passing over either or both of a multiple number of lanes and through a predetermined detection area according to their direction of travel and is an improvement over the inventions covered by my earlier copending applications, Ser. No. 820,225, filed June 15, 1959, and Ser. No. 841,389, filed September 21, 1959, Patents 3,109,157 and 3,079,077, respectively.

It is frequently necessary in the control of vehicular traffic to provide means for the selective detection and/or counting of vehicles in accordance with their direction of travel as they pass through a defined detection area. One particular use for such a system is in the counting of vehicles entering and leaving a parking area. Where a particular passageway is organized to permit vehicles to enter and also leave the parking area, it is necessary to detect separately the vehicles according to their direction of travel so that a running count can at all times be maintained of the number of available spaces in the parking area and thereby permit vehicles to be directed away from such area when its capacity has been reached. Such a system for the control of traffic in a parking garage is fully disclosed in Patent No. 2,482,610 to Philip H. Burn, granted September 20, 1949, and assigned to the assignee of the present invention.

It is proposed in accordance with this invention to provide a vehicle detection and registration system capable of detecting and counting accurately vehicles moving in opposite directions on a multiple lane highway or through a multiple lane passageway. It is, moreover, contemplated that this system will accurately count such vehicles even though any particular vehicle may not remain in its own assigned lane but may move partially or wholly into the second of the two lanes. Furthermore, the system is designed to operate accurately even though vehicles may pass through the detection area at an angle or may pass partially through the detection area and then reverse their direction. Furthermore, the system is organized to operate properly even though the vehicles in any particular lane may travel through the detection area in either direction.

It is proposed that the system employ individual vehicle detectors which are of the "presence" detection type in that they provide a distinctive output whenever a vehicle occupies a predetermined detection zone. Vehicle detectors of this type are readily distinguishable over the wheel-actuated type, for example, which produce a distinctive output only upon the passage of a wheel or axle of the vehicle but produce no continuous output throughout the time that the vehicle occupies a detection zone. Various types of vehicle presence detectors may be employed to fulfill the requirements of this invention; thus, a photocell detector may be used or, alternatively, one which employs an antenna energized with high frequency radiation and is "loaded" by the presence of a nearby vehicle.

Preferably, however, it is contemplated that a vehicle detector of the ultrasonic pulsed type be employed, such as that shown in the prior application of Kendall et al., Ser. No. 808,736, filed April 24, 1959, Patent Number 3,042,303. In a vehicle detector of this type, repetitive sound pulses are transmitted downwardly toward the tops of passing vehicles, with the pulses impinging upon the pavement when no vehicle is present. These pulses are transmitted from a transmitting transducer positioned overhead, and each pulse is of quite short duration such as one millisecond. A receiving transducer is positioned near and associated with each transmitting transducer and receives reflections of the transmitted sound pulses both from the pavement when no vehicle is present and, alternatively, from the sound reflecting surfaces of the vehicle whenever such vehicle lies within the sound beam.

Gating circuits are employed which render it possible to distinguish vehicle reflection pulses from pavement reflection pulses and thereby detect when a vehicle is present. In one form of such vehicle detector, a relay is used and this relay is operated to a distinctive condition as long as the vehicle remains within the sound beam.

Each vehicle detector thus defines, by its transmitted sound beam, a detection zone in the sense that the passing of a vehicle into such zone produces a distinctive output such as a relay operation. To provide directional detection of the vehicles, it is necessary to arrange a plurality of detectors in the detection area so that each vehicle must pass in succession through at least two spaced detection zones. At the same time, it is necessary that successive detectors be so spaced across the width of the passageway that not even the narrowest expected vehicle can pass between adjacent vehicle detection zones. This is accomplished in the present invention by providing two spaced rows of vehicle detectors with each row being generally transverse to the direction of travel of the vehicles so that each vehicle must pass through at least one detector of the first row and then subsequently through at least one detector of the second row.

Two parallel lanes are provided for the purposes of this disclosure, one for each direction of travel, and pavement markings may be employed to demarcate the respective lanes. It is, however, desirable that no actual physical barrier be employed to separate the two lanes since this tends to make it difficult for wide vehicles such as trucks to enter the passageway. Of course, if no actual physical barrier is employed, then it may well occur that a vehicle passing in a particular direction may move out of its normally assigned lane and actually move into the other lane so as to be detected by the detectors for such other lane. Despite this, it is desirable that the system be so organized that such vehicle will properly be detected. Thus, the directional detection of vehicles is to be effected even though a particular vehicle may not pass through the passageway in the lane ordinarily assigned to that direction of travel but may instead pass through the lane for the opposite direction of travel. Also, under some conditions, it may be necessary to utilize both lanes for a single direction of travel. Again, under such circumstances, vehicles in the one lane must be properly registered even though they are traveling in a direction opposite to that normally taken by vehicles in that lane.

It is desirable that it be possible to detect a second vehicle which so closely follows a first vehicle that it occupies a detection zone of the first-encountered row before the vehicle ahead has left the detection zone of the second row. The ability to detect and register vehicles separately under these conditions ensures that proper counting will result even though vehicles follow one another quite closely as they pass through the detection area. On the other hand, the sequence of occupancy of the detection zones which occurs under such circumstances is essentially duplicated whenever a single vehicle almost passes partially through the passageway but then reverses its direction. It is, of course, highly desirable that the vehicle which partially passes through the detection area but then reverses its direction not be counted as a vehicle completely passing through the detection area, but that vehicles passing in close succession be all registered. The present invention properly distinguishes between these two conditions.

It is often desirable that the vehicle counts for the individual lanes of the passageway be registered on a single totalizer so that a cumulative total may be maintained of the total number of vehicles that occupy the area served by the passageway. Moreover, where there are additional passageways serving the same area, as often occurs in connection with a parking garage, then it is desirable to register all the vehicle counts from the respective passageways on the same totalizer so that information as to the total number of vehicles in the parking area is always available on the single totalizer. This makes it quite likely that simultaneous counts will occur. Since the customary totalizer apparatus operates only one count at a time, it is necessary to produce successive operations of the totalizer, one for each vehicle registered. One feature of the present invention is the provision of improved apparatus for accomplishing this result.

It is, therefore, an object of the present invention to provide a vehicle detection and counting system for counting vehicles successively according to their direction of travel as they pass through an unrestricted, dual lane passageway.

It is another object of this invention to provide a system for the selective counting of vehicles according to their direction of travel as they pass in either direction through either of the two lanes of a passageway.

It is a further object of this invention to provide a system for the selective detection of vehicles passing through a dual lane passageway according to their direction of travel and for successive vehicles passing in close succession through said passageway.

Another feature of this invention is to provide means whereby substantially simultaneously occurring vehicle detections may register in succession on a single totalizer.

Other objects, purposes, and characteristics of this invention will in part be obvious from the drawings and in part pointed out as the description of the invention progresses.

To simplify the illustration and facilitate the explanation of this invention, the various parts and circuits constituting the embodiment have been shown diagrammatically so as to make it easy to understand the principles and mode of operation rather than to illustrate the specific construction and arrangement of parts that would be employed in practice. The various relays and their contacts are illustrated in a conventional manner, and symbols are used to indicate connection to the terminals of the batteries and other sources of electrical current instead of showing all wiring connections to these terminals.

In describing the invention in detail, reference will be made to the accompanying drawings in which like reference characters designate corresponding parts in the several views and in which:

FIGS. 1A and 1B illustrate a typical dual lane passageway with three vehicle detector units shown positioned overhead in FIG. 1A and with the resulting detection zones shown in FIG. 1B;

FIG. 2 is a circuit diagram of the lane interlocking circuits;

FIG. 4 illustrates the count pulse control circuits;

FIGS. 5A and 5B illustrate the counting circuits of this invention;

FIGS. 6A, 6B and 6C illustrate various sequential vehicle operations and also the resulting relay operations; and FIG. 7 is a block diagram of the vehicle detection apparatus.

*General Description—FIGS. 1A and 1B*

Figure 3C:
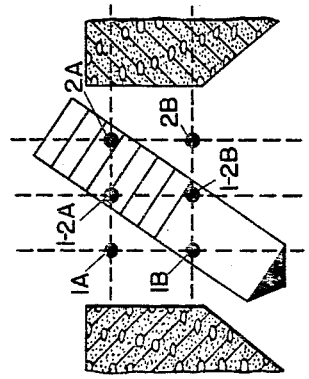
FIGS. 3A, 3B, 3C, 3D, 3E and 3F illustrate the various ways in which single and multiple vehicles may pass through the passageway and yet be properly accommodated by the system of this invention.

FIGS. 1A and 1B illustrate how the invention may be used to count vehicles passing in either direction through a dual lane passageway. FIG. 1B illustrates that six individual vehicle detectors may be used, three of them being used in each of two separate rows, A and B, which are each generally transverse to the direction of vehicle travel. In FIG. 1B only the individual detector zones are diagrammatically illustrated by the shaded circles.

Of course, it is by no means necessary that the detection zones be of circular configuration. Indeed, they may be lengthened if desired in the direction transverse to vehicle travel and may even be so lengthened that adjacent zones will be substantially contiguous. Preferably, however, the adjacent detection zone should not be lengthened to the point where a single vehicle can simultaneously occupy all three detection zones of a single row.

FIG. 1A illustrates the manner in which the transducers may be positioned when a pulsed ultrasonic vehicle detection system is employed as is preferred. A transducer unit comprising both a transmitting transducer T and a receiving transducer R are positioned substantially over the center of each of the two lanes. Only one of such transducer units for each lane is shown in FIG. 1A, but it will be understood from FIG. 1B that there are two such units substantially directly in line with each other so that each vehicle must pass under at least two such units.

In addition to the detector units for each lane, two additional detector units are provided and these are positioned so as to define detection zones which are more or less coincident with the center of the passageways which may be defined by a lane marker as shown in FIG. 1B. The function of such marker is to indicate to each driver the confines of the lane within which he should stay in the event that there is another vehicle using or about to use the same passageway and proceeding in the opposite direction. Under these circumstances, if each vehicle stays properly in its own lane, then neither vehicle will occupy the center detection zones. However, when only a single vehicle is using the passageway, then it is not required that such vehicle stay within its particular lane in order for it to be properly registered; instead, such vehicle may proceed at any angle across the passageway and may exit through the entrance lane or vice versa and still be properly registered.

A vehicle which is "entering," must pass through one or more detection zones in row A and then, subsequently, through one or more detection zones of row B. Vehicles of ordinary length will, for a time, occupy a detection zone in both row A and row B. Of course, as a vehicle progresses in the "entering" direction along either lane, it will eventually vacate first a detection zone in row A and then subsequently a detection zone in row B. For a vehicle "exiting," the sequence of events will be exactly the opposite of that just described.

As will hereinafter appear, the sequence in which the detection zones are occupied and then vacated by a vehicle signifies its direction of traffic; and, normally, registration of the vehicle occurs at the time it vacates the detection zones of the second encountered row.

In the drawings, the nomenclature is arranged so that the detection zones for lane 1 are provided with a prefix "1," and the detection zones for lane 2 similarly with a prefix "2." The middle detection zones which lie along the central lane divider have the prefix "1–2." In each case, the detection zone has a suffix "A" or "B" depending upon whether it is in row A or row B.

*Vehicle Detection Apparatus—FIG. 7*

The ultrasonic vehicle detection apparatus I prefer to use in practicing the present invention is illustrated in block diagram form in FIG. 7. The vehicle detector apparatus there disclosed not only makes use of the vehicle reflections that are received whenever a vehicle is within the sound beam but also makes use of the pavement reflections that occur when no vehicle is present. As is described in considerable detail in the copending applications of Kendall et al., Ser. No. 808,736, Patent 3,042,-

303, and J. H. Auer, Jr., Ser. No. 820,225, filed June 15, 1959, Patent 3,109,157, this results in a high degree of discrimination against spurious operation. More specifically, the system is so organized that in order for a vehicle to be detected, it is required that a prescribed series of events occur: namely, it is first required that the normally received pavement reflection pulses cease and that vehicle reflection pulses instead be received; and, secondly, it is necessary that vehicle reflections cease and pavement reflections again be restored in order for the apparatus to be restored to the normal condition so that a subsequent vehicle can be detected.

In FIG. 7, an ultrasonic pulse generator 84 is shown as applying its output to a transmitting transducer T. The signal provided by the pulse generator for energizing the transducer T comprises repetitive sound pulses of quite short duration such as one millisecond and occurring with a repetition rate as fast as possible but still slow enough so that a pavement reflection can be received from each transmitted pulse prior to the transmission of the next pulse.

At the time each sound pulse is generated by the pulse generator 84, the vehicle reflection gate generator 85 is set into operation, and this circuit generates a gating voltage whose duration encompasses the expected reception time of reflection pulses from a vehicle. At the end of the time interval demarcated by this gate generator 85, the pavement reflection gate generator 86 is set into operation, and this latter circuit generates a gating voltage at a later time which encompasses the expected reception time of a pavement reflection pulse.

Reflection pulses which impinge upon the receiving transducer R are amplified by amplifier 83 and applied to both the gated vehicle reflection amplifier 87 and the gated pavement reflection amplifier 89. These are selectively gated by the vehicle reflection gate generator 85 and pavement reflection gate generator 86, respectively. Consequently, the vehicle reflection amplifier produces an output pulse which is applied to the bistable state device 93 for each received vehicle reflection pulse. Similarly, the pavement reflection amplifier 89 supplies an output pulse to the bistable state device 93 for each received pavement reflection pulse. When no vehicle is present within the detection zone, the device 93 therefore receives an input pulse from pavement reflection amplifier 89 for each transmitted sound pulse. As long as it receives such input pulses, the device 93 remains in a first one of its two distinctive conditions and thus is effective to control the relay control circuit 94 so that detector relay 1A remains in its normal dropped-away condition. However, when a vehicle enters a detection zone, the bistable state device 93 can no longer receive input pulses from the pavement reflection amplifier 89; instead, it then receives successive input pulses from the vehicle reflection amplifier and this causes the device 93 to be operated to the opposite of its two stable conditions. It then controls the relay control circuit 94 in such a manner that detector relay 1A is picked up. Relay 1A then remains picked up until the vehicle has departed from the detection zone.

Apparatus for the detection of vehicle presence is associated with each detection zone shown in FIG. 1B, and each such apparatus is like that just described in connection with FIG. 7. Therefore, as shown in FIG. 2, there is a detection relay for each such zone and thus two such relays for each lane. These relays are illustrated in FIG. 2 and are provided with the same nomenclature that has been provided for the respective zone.

*Lane Interlocking Relay Circuits—FIG. 2*

Both of the detector relays for lane 1, i.e., relays 1A and 1B, and also the corresponding relays in lane 2 are illustrated in FIG. 2 as having repeater relays associated therewith a repeater relay 1AP which is energized through front contact 6 of relay 1A whenever the latter relay is picked up. Relay 1BP is a repeater relay of 1B and is energized through front contact 8 of relay 1B whenever that relay is picked up. In a similar manner, relays 2AP and 2BP act as repeaters of relays 2A and 2B, respectively. It is the operation of these repeater relays which signifies the passage of a vehicle in a particular direction and along a particular lane and not the operation of the detector relays themselves. For example, the successive picking up of relays 2AP and 2BP, followed by their sequential dropping away, effects registration of an entering vehicle in lane 2.

The lane dividing detector relays 1-2A and 1-2B are similar to the lane detector relays just described in that they also are picked up whenever a vehicle occupies the associated detection zone. However, these relays 1-2A and 1-2B are not provided with direct repeater relays in the nature of those provided for detector relays 2A or 2B, for example. Instead, contacts of relay 1-2A, for example, are used to augment control of either relay 1AP or 2AP, dependent upon whether the vehicle has occupied a detection zone of lane 1 or lane 2, respectively, in addition to one of the central detection zones 1-2A or 1-2B. More specifically, considering FIG. 3B, the vehicle shown first occupied zones 2B and 1-2B. Thereafter, and until this vehicle has passed entirely through the passageway, detection zones 1-2A and 1-2B are both associated with zones 2A and 2B, respectively, rather than detection zones 1A and 1B. The practical result of this association is that relays 2A and 1-2A together jointly control the operation of relay 2AP and, similarly, relays 2B and 1-2B together jointly control the operation of relay 2BP. Because of this joint control of relay 2AP, the vehicle may depart from detection zones 2A and 1-2A at slightly different times, as is likely to happen whenever the vehicle travels at an angle as in FIG. 3B, and yet produce only a single actuation of relay 2AP. There is thus no possibility of counting such a vehicle twice.

Of course, when a vehicle occupies a detection zone of lane 1 and, concurrently therewith, also a center zone of the same lane, then both center detection zones are associated with the respective lane 1 detection zones. Thus, in FIG. 3A, for example, the joint occupancy of zones 1B and 1-2B associates relay 1-2B with relay 1B so that they jointly control relay 1BP. Because of this, the vehicle may depart from zone 1-2B an instant later than from zone 1B but only a single actuation of relay 1BP nevertheless results.

In order to transfer the function of the lane dividing detector relays 1-2A and 1-2B to either lane 1 or lane 2 as required, a transfer relay T is provided. When this relay is dropped away, relays 1-2A and 1-2B are associated with the lane 1 detector relays 1A and 1B. On the other hand, when relay T is picked up, relays 1-2A and 1-2B are instead associated with the lane 2 detector relays 2A and 2B.

Figure 3F:
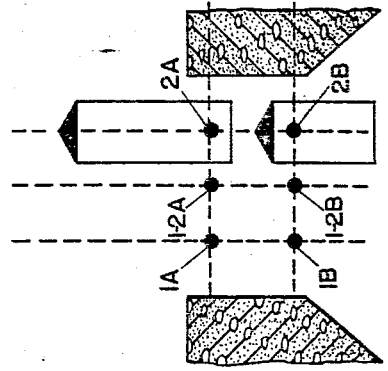
Figure 3B:
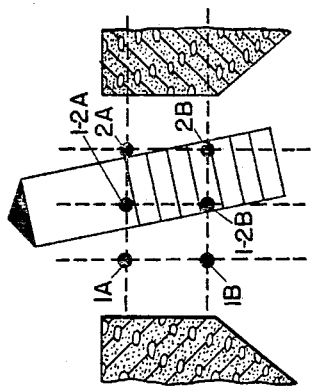
Figure 3E:
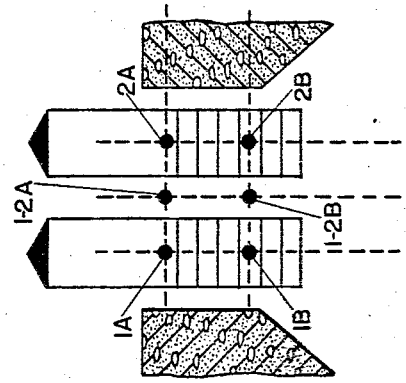
Figure 3A:
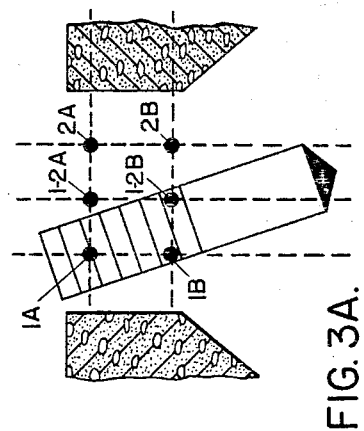

In order to describe the circuit of FIG. 2, it is believed expedient to explain the manner in which it operates under typical conditions, such as are illustrated in FIGS. 3A–3C. Considering first the conditions of FIG. 3A, upon the entrance of the vehicle into the passageway, it first passes into detection zone 1A, but then because of the angle of its movement, it subsequently occupies both detection zones 1B and 1-2B. Because of the angle of its progress, it does not occupy zones 1B and 1-2B at the same instant, but rather sequentially. It also departs from these latter two detection zones sequentially and in the same order.

As soon as the vehicle enters detection zone 1A, relay 1A picks up and this causes its repeater relay 1AP also to pick up through closed front contact 6 of relay 1A. A short time later, the vehicle enters detection zone 1B and at such time relay 1B picks up. This is followed by the picking up of the repeater relay 1BP through front contact 8 of relay 1B. Under these circumstances, both back contact 7 of relay 1A and back contact 9 of relay 1B are open so that the two alternate pick-up circuits for relay T are both open and this relay cannot now pick up. Because of this, the detector relays 1-2A and 1-2B are now associated with the lane 1 detector relays, and this is shown by the fact that when the vehicle shortly thereafter occupies detection zone 1-2B and picks up the corresponding relay 1-2B, a circuit is then completed through the front contact 19 of relay 1-2B, back contact 13 of relay T, back contact 27 of relay 2B, and through the winding of relay 1BP to (−).

By this latter circuit, the relay 1BP is now provided with two parallel energizing circuits and it therefore cannot drop away until both of these circuits have been interrupted. In other words, the mere departure of the vehicle from detection zone 1B so as to open its front contact 8 will now not permit relay 1BP to drop away. Instead, it is now required that relay 1-2B also drop away so as to open its front contact 19. The result of this is that relay 1-BP cannot drop away until the vehicle has departed from both detection zones 1B and 1-2B. Of course, before this has happened, the vehicle will have departed from detection zone 1-A. When this occurs, relay 1AP will drop away since this relay is not maintained energized by an alternate circuit through front contact 17 of relay 1-2A as this latter relay was not picked up. Later, as the vehicle departs from detection zone 1-2B so that relay 1-2B drops away (relay 1B having already dropped away), repeater relay 1BP drops away in the manner already described. The over-all result is then that both relays 1AP and 1BP are picked up sequentially and then both dropped away in the same sequence. As will later be apparent, such sequential actuation of relays 1AP and 1BP result in the registration of a "subtract" count, i.e. the subtraction of a single count because of the entrance of a vehicle into the area served by the passageway thus making one less parking space available in the area served by the passageway.

Referring now to FIG. 3B, and also to FIG. 2, the vehicle in FIG. 3B is shown as proceeding in the opposite direction from that of FIG. 3A. Also, the vehicle appears generally in lane 2, at least as it crosses the detection zones of row B. More specifically, the vehicle first enters detection zone 2B and shortly thereafter enters detection zone 1-2B. When the front of the vehicle reaches the detection zones of row A, it enters only the detection zone of 1-2A because of the angle of its path.

When the vehicle first enters detection zone 2B, relay 2B of FIG. 2 picks up and completes a circuit through its front contact 26 to energize its repeater relay 2BP. Shortly thereafter, the vehicle enters detection zone 1-2B and when it does so a circuit is completed through front contact 28 of relay 2B, front contact 20 of relay 1-2B, back contact 9 of relay 1B, and back contact 11 of relay 1BP to the winding of relay T. With the picking up of relay T, a circuit is completed through front contact 19 of relay 1-2B, and front contact 13 of relay T to the winding of relay 2BP to energize the latter relay. In other words, two alternative pick-up circuits are now provided for relay 2BP, the first being through front contact 26 of relay 2B and the latter through front contact 19 of relay 1-2B. Because of this, relay 2BP now cannot be dropped away until the vehicle has departed from both detection zones 2B and 1-2B; and, therefore, only a single actuation of relay 2BP can result even though the vehicle leaves the respective detection zones at slightly different times because of the angle of its path. Incidentally, once relay T has been picked up in the manner described, a stick circuit is maintained for this relay through front contact 22 of relay 2BP so that relay T will remain energized as long as relay 2BP is picked up.

When the front of the vehicle reaches the detection zones of row A, relay 1-2A picks up and closes its front contact 17 to complete a circuit for the energization of relay 2AP through such front contact 17 and front contact 12 of relay T. In other words, by reason of the association of the lane-dividing detection zones with those of lane 2, which occurred when the vehicle passed concurrently through both detection zones 1-2B and 2B so that relay T picked up, repeater relay 2AP is now picked up even though there has been no energization of relay 2A. The picking up of relay T thus has had the effect of permitting the actuation of repeater relay 2AP by an occupancy of either or both of detection zones 1-2A or 2A.

As the vehicle continues the movement set forth in FIG. 3B, the rear of the vehicle eventually departs from both detection zones 2B and 1-2B in that order. As it departs from the second of the two mentioned detection zones, repeater relay 2BP drops away in the manner described above. Later, as the rear of the vehicle departs from the detection zones of row A, relay 1-2A drops away, and this opens the energization circuit of relay 2AP so that it also drops away. Thus, the vehicle moving over the path shown in FIG. 3B has caused the relays 2BP and 2AP to be first picked up sequentially and then dropped away in the same sequence and this, as will subsequently be shown, is sufficient to meet all the necessary requirements for registering a single vehicle passing in the exiting direction through the passageway.

FIG. 3C illustrates an extreme condition wherein a vehicle enters at such an angle that it passes through detection zones of both lanes 1 and 2 as well as, of course, the lane-dividing zones. More specifically, the vehicle first enters detection zone 2A and shortly thereafter detection zone 1-2A. Nothing more occurs until the front of the vehicle reaches the detection zones of row B at which time detection zone 1-2B becomes occupied and shortly thereafter detection zone 1B. The vehicle, of course, departs from these various detection zones in the same order.

When the front of the vehicle first enters the front of detection zone 2A, a circuit is completed through front contact 23 of relay 2A to pick up relay 2AP. When relay 1-2A picks up, a circuit is completed to energize transfer relay T through front contact 25 of relay 2A, front contact 18 of relay 1-2A, back contact 7 of relay 1A, and back contact 10 of relay 1AP. Relay T when picked up in response to this energization, is maintained energized through a stick circuit which includes front contact 21 of relay 2AP and front contact 14 of relay T. Incidentally, it may be noted that immediately upon the picking up of relay 2A, its back contact 24 opened, thereby making it impossible for relay 1AP to be energized through its alternate pick-up circuit upon the subsequent closure of front contact 17 of relay 1-2A.

With relay T now picked up, an alternate pick-up circuit for relay 2AP is completed through front contact 17 of relay 1-2A and front contact 12 of relay T. Relay 2AP cannot therefore drop away until both of these pick-up circuits are opened, i.e. it cannot drop away until the vehicle has departed from both detection zones 2A and 1-2A so that both relays corresponding to these detection zones have dropped away. Of course, before the end of the vehicle has cleared the detection zones of row A, the front part of the vehicle will have sequentially occupied the detection zones 1-2B and 1B. When relay 1-2B picks up, a circuit is completed through front contact 19 of this relay and through front contact 13 of relay T to energize relay 2BP. Thus, it can be seen that relay 2BP is picked up at such time even though the lane detection relay 2B has not been energized. The front of the vehicle also shortly thereafter occupies detection zone 1B so that repeater relay 1BP is picked up.

When the rear of the vehicle finally departs from detection zones 2A and 1-2A, relay 2AP is permitted to drop away as has been described. As the vehicle continues its movement, the rear of the vehicle finally clears detection zone 1-2B and when this happens, front contact 19 of this relay is opened so that relay 2BP is dropped away. So far, therefore, the passage of the vehicle has resulted in the sequential picking up of relay 2AP and 2BP and their later dropping away also in the same sequence. This, as later will be described, satisfies the conditions necessary to register the entrance of a vehicle through the passageway. However, the vehicle, under the circumstances shown in FIG. 3C, eventually also departs from detection zone 1B and when this happens, front contact 8 of this relay opens so that its repeater relay 1BP drops away. This cannot, however, produce a vehicle actuation for the reason that the associated relay 1AP was not energized at any time by the vehicle. In other words, a vehicle can be registered only if it produces successive operation of the relays 1AP and 1BP or, alternatively, successive operations of the relays 2AP and 2BP, but merely the successive picking up and dropping away of one of the relays of each pair cannot result in registration of a vehicle. This mode of operation will be described in detail when FIG. 4 is being considered.

Figure 3D:
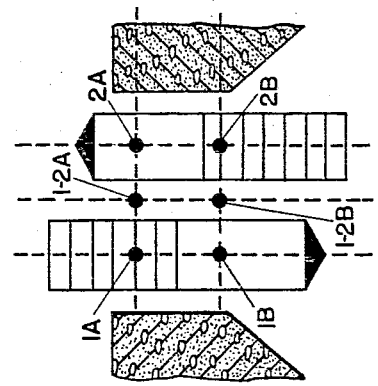

From the above description, which has concerned itself with the more complicated types of vehicle movements on the passageway, it will be readily understood that successive operation of repeater relays for a particular lane will occur when the vehicle in succession occupies the detection zones only of one particular lane. For example, the vehicle shown as entering through lane 1 of FIG. 3D first causes the picking up of relay 1A and its associated repeater relay 1AP followed later by the picking up of relay 1B with its associated repeater relay 1BP. As the vehicle continues its course, relays 1A and 1B are dropped away successively so that relays 1AP and 1BP are similarly dropped away. This, as already described, is sufficient to cause registration of a vehicle entering through the passageway.

Where one vehicle is entering the another leaving, as shown in FIG. 3D, it is assumed that each vehicle will stay in its respective lane and not enter detection zones 1–2A or 1–2B. It is reasonable to assume that vehicles will not occupy the center detection zones because, to do so, would require the vehicles to pass so closely together that they would be in danger of colliding. The purpose of the lane-dividing marker becomes apparent under these conditions for its particular function is to demarcate lanes so that each driver will tend to stay within the boundaries of that lane assigned to his direction of travel. Therefore, if the first of the two vehicles appears in lane 2 so as to pick up either relay 2A or 2B, but not relay 1–2A nor relay 1–2B, there can be no energization of relay T because both front contacts 18 and 20 of relays 1–2A and 1–2B, respectively, will be open. Of course, no pick-up circuit can be established for relay T if the first vehicle appears in lane 1, since the picking up of relays 1A and 1B will similarly open the pick-up circuits for relay T. The fact that relay T cannot pick up under these conditions does not mean, however, that the detection zones 1–2A and 1–2B are now associated with the corresponding detection zones of lane 1. The picking up of relay 1–2B, for example, now cannot close the alternate pick-up circuit for relay 1BP because of the open back contact 27 of relay 2B resulting from the occupancy of detection zone 2B. Instead, the individual vehicles in their respective lanes will energize sequentially only the repeater relays associated with that lane and will cause both vehicles thereby to be distinctively registered according to their direction of travel.

From the description already given, it will be apparent that there is no requirement for a vehicle entering to confine itself necessarily to lane 1, nor for an exiting vehicle to remain only in lane 2 since directional detection exists with respect to each lane with the result that vehicles may pass in either direction along either or both lanes.

*Count Pulse Control Circuit—FIG. 4*

FIG. 4 illustrates the count pulse control circuits for lane 2; it will be understood that identical circuits are provided for lane 1 as well. The count pulse control circuits are shown as being controlled by relays 2AP and 2BP whose operation has already been described in connection with FIG. 2. The count pulse control circuits for lane 1 are similarly operated by the corresponding relays 1AP and 1BP which are also illustrated in FIG. 2.

The count pulse control circuits also include two directional relays 2X and 2N. Both these relays are normally picked up, but are dropped away selectively in accordance with the direction of travel of the vehicle through the respective lane.

The direction of travel of the vehicle, of course, controls the sequence of operation of the relays 2AP and 2BP, and this sequence of operation controls whether the exit relay 2X will be dropped away to signify thereby that a vehicle is passing in the exiting direction through the passageway, or alternatively, whether the directional relay 2N will be dropped away to thereby signify that a vehicle is passing in the entering direction through the passageway.

Count relay 2C and repeater relay 2CP are normally operated in a predetermined sequence for each vehicle passing in either direction through the passageway. This sequence of operation results in the registration of a count on the counting circuits which are illustrated in FIG. 5 and which will sebsequently be described in detail. Whether the count registered is one that is to be added or subtracted to the cumulative count is dependent upon whether relay 2X or relay 2N is dropped away at the particular time that relays 2C and 2CP go through such predetermined cycle of operation.

Once the count and count repeater relays 2C and 2CP have gone through such distinctive cycle of operation, a circuit is completed to energize a normally deenergized restoration relay 2RS. When this relay picks up, it restores the then dropped-away directional relay to its normal picked-up condition. When it has accomplished this, the restoration relay 2RS is then restored to its dropped-away condition.

The above general description deals with the ordinary spaced passage of vehicles. However, there are times when one vehicle will follow another in quite close succession through the passageway. In fact, the spacing may be so close that a following vehicle may enter the passageway and have its presence detected before the vehicle ahead has entirely cleared the detection zone of the second row. This situation is detected by the count pulse control circuits of FIG. 4 and results in the picking up of relay 2F. The picking up of this latter relay modifies the operation of the count pulse control circuits and the principal reason for doing this is to forestall the normal counting operation and thereby prevent a count from being registered when a vehicle only partially passes through the passageway and then reverses its course. As will hereinafter be more fully described, the sequence of events under these latter circumstances is very similar to those existing when one vehicle closely follows another through the passageway. However, with the picking up of relay 2F, it becomes readily possible to distinguish between these two similar conditions.

A detailed description of the circuits of FIG. 4 can best be given by describing the mode of operation under several different conditions. Considering first, for example, a vehicle which is exiting in lane 2 in the manner illustrated in FIG. 3B, it will be recalled in connection with the description of the circuits of FIG. 2 that such movement of a vehicle resulted first in the picking up of relay 2BP when the front of the vehicle moved into the detection zones of row B, followed by the picking up of relay 2AP when the front of the vehicle passed into the detection zone 1–2A of row A, and that, furthermore, these two relays then dropped away in the same order as the rear of the vehicle moved out of the respective detection zones.

Referring to FIG. 4, it will be seen that the picking of relay 2BP immediately results in the dropping away of the directional relay 2X since the stick circuit maintaining the lower winding of this relay energized through back contact 40 of relay 2BP is then open. As soon as the directional relay 2X drops away, an alternate stick circuit is provided for the lower winding of the other directional relay 2N through back contact 51 of relay 2X. This latter circuit prevents the later droping away of relay 2N when relay 2AP picks up and opens its back contact 30 which is normally holding relay 2N energized. Thus, it can be seen that these two directional relays are interlocked in a sense in that the dropping away of one of them thereafter prevents the other from dropping away.

The count relay 2C can be energized through either of two alternate pick-up circuits. One of these pick-up circuits is established when a vehicle is moving in the entering direction through lane 2; whereas, the other is established whenever the vehicle is moving in the exit direction through lane 2. Under the conditions presently being described, it is apparent that the pick-up circuit which must be utilized must be the one which includes back contact 55 of the directional relay 2X. This circuit can only be completed when back contact 45 of relay 2BP is closed and front contact 35 of relay 2AP is also closed. This means that the pick-up circuit can only be established when the vehicle has progressed sufficiently far through the passageway so that its rear portion will have cleared the detection zones of row B, but with the vehicle still occupying one or more of detection zones 2A or 1-2A of row A. At such time, relay 2BP will drop away and close its back contact 45 while relay 2AP is still picked up, with its front contact 35 closed to thereby permit a circuit to be completed to energize relay 2C. As soon as relay 2C picks up, a circuit is completed through back contact 82 of relay 2F and front contact 91 of 2C to energize the winding of repeater relay 2CP and cause this latter relay also to pick up.

As the vehicle continues its movement through lane 2 of the passageway, it eventually clears detection zone 1A, and, when this happens, relay 2AP drops away. This opens the pick-up circuit for count relay 2C at front contact 35 of relay 2AP. Relay 2C is now deenergized but cannot drop away immediately because of the slow release characteristics provided for this relay as designated by the heavy base line for the symbol representing this relay. After a predetermined interval, however, relay 2C does drop away and opens its front contact 91, thereby deenergizing the winding of the repeater relay 2CP. Relay 2CP is also provided with slow release characteristics but its drop-away time is substantially less than that provided for relay 2C for reasons which will subsequently become clear. It is during this interval, when relay 2C has dropped away but relay 2CP, although deenergized, has not yet dropped away, that counting of the vehicle occurs. This will subsequently be made clear when the counting circuits of FIG. 5 are described in detail.

When the repeater relay 2CP does finally drop away, it closes its back contact 104, and this permits a circuit to be completed which will energize relay 2RS. This circuit is completed through back contact 31 of relay 2AP, back contact 41 of relay 2BP, back contact 104 of relay 2CP, and back contact 52 of relay 2X, to winding of relay 2RS. Upon the picking up of the restoration relay 2RS, a circuit is completed through its front contact 70 to energize the upper winding of directional relay 2X and thereby restore this latter relay to its normal picked-up condition. As soon as relay 2X is picked up, a circuit is completed through back contact 40 of relay 2BP and front contact 50 of relay 2X to hold relay 2X energized through its lower winding. At the same time the picking up of relay 2X causes the opening of its back contact 52, thereby interrupting the energizing circuit of relay 2RS so that this relay is deenergized. Relay 2RS is provided with a slight amount of slow release time which is sufficient to permit the just described stick circuit for relay 2X to be established before the pick-up circuit through front contact 70 is opened by the release of relay 2RS.

Operation of the relays of FIG. 4 under conditions quite similar to those just described is set forth in FIG. 6A which shows a vehicle exiting in lane 2 and thus occupying sequentially detection zones 2B and 2A. In FIG. 6A and also in FIGS. 6B and 6C, an arrow with an accompanying reference character denotes actuation of the relay corresponding to the reference character. An upwardly pointing arrow denotes a relay which is being picked up whereas, a downwardly pointing arrow denotes a relay which is being dropped away. An arrow of longer length indicates that the relay is provided with slow operating characteristics, and the relative length of such arrow roughly indicates the relative operating time of the respective relay.

Because of the symmetry of the circuit of FIG. 4, it will be apparent that a similar sequence of relay operations will occur for a vehicle moving in lane 2 but in the opposite direction from that just described. Under such circumstances, the relay 2AP will be operated before relay 2BP and this will cause the directional relay 2N to drop away rather than relay 2X. The remainder of the relay operations will be then substantially identical to those just described.

When one vehicle follows another quite closely through the passageway and through the same lane, the sequence of relay operations is modified to a certain extent for reasons which have already been described in a general manner. To describe this modified operation, it will be assumed that a plurality of vehicles is passing in close succession in the exiting direction through lane 2 in the manner shown in FIG. 3F. In describing these circuits, reference will also be made to FIG. 6B which correlates the relay operations with the progress of the vehicles through the passageway.

Upon entry of a first vehicle, designated VI, into zone 2B, relay 2BP is picked up in the manner previously described. As soon as relay 2BP picks up, relay 2X is dropped away, thereby establishing the fact that the vehicle is proceeding in the exiting direction. Nothing further happens until the front portion of the vehicle occupies detection zone 2A. At that time, relay 2AP picks up.

When the vehicle has progressed sufficiently so that its rear portion departs from detection zone 2B, repeater relay 2BP drops away. In the same manner as was previously described in connection with the mode of operation for a single vehicle, the dropping away of relay 2BP causes the picking up of relay 2C and thereafter the picking up of its repeater relay 2CP as well.

Ordinarily, upon the departure of the first vehicle VI from zone 2A, as illustrated at line E, such vehicle would be registered. If it were a certainty that the vacation of the vehicle from detection zone 2A had come about because of the continued forward progress of the vehicle as shown in FIG. 6B, such vehicle registration could be entirely proper. However, it is also entirely possible that the vacation of zone 2A comes about instead from a reversal of direction as shown in FIG. 6C. In order that the system might properly distinguish between these two conditions, it is so organized that upon the reoccupancy of the just vacated zone at a time when the other zone of the same lane is still occupied, the normal registration circuits have their operation altered so that the mere vacation of such other zone cannot itself effect registration although this is all that is otherwise required. Instead, vehicle registration can only then occur when there is simultaneous occupancy of both the detection zones. This latter condition occurs when the vehicles are moving forward as FIG. 6B shows, but not for a vehicle reversing its course as in FIG. 6C. Thus, although the normal vehicle registration is forestalled under both the condition of FIG. 6B and also that of FIG. 6C, the double occupancy condition which thereafter occurs in FIG. 6B is readily distinguishable from the conditions occurring in FIG. 6C, so that registration can then be permitted to occur.

To forestall the normal counting operation under the circumstances just described, a relay 2F is provided, and this relay is picked up whenever zone 2B (see FIGS. 6B and 6C) becomes occupied (after having become unoccupied by a vehicle) at a time when zone 2A is still occupied. Of course, for the opposite direction of vehicle travel a similar situation exists which is manifested by the fact that the just vacated zone 2A becomes reoccupied at a time when 2B is still occupied and this too results in the picking up of relay 2F. Thus, relay 2F will pick up under the conditions where one vehicle follows another closely as illustrated in FIG. 6B at line D, and it will also pick up whenever a vehicle changes its course as in FIG. 6C.

More specifically, when relay 2BP picks up in response to a second following vehicle under the conditions described in connection with FIG. 6B, one result is that relay 2C is deenergized because of the now open back contact 45 of relay 2BP. Of course, this relay 2C cannot drop away immediately because of its slow release characteristics. Another result of the picking up of relay 2BP is that a circuit is completed through the winding of relay 2F to pick this relay up. This circuit receives its energization from a charge on capacitor 15, which capacitor becomes charged through resistor 29 whenever back contact 44 of relay 2BP is closed. However, as soon as relay 2BP picks up and closes its front contact 44, and assuming also that relay 2AP is picked up at that time so that its front contact 34 is closed, a circuit is then completed through back contact 54 of relay 2X and front contact 90 of relay 2C to energize the winding of relay 2F. When relay 2F picks up, a stick circuit is completed for it through front contact 42 of relay 2BP, back contact 53 of relay 2X, back contact 105 of relay 2CP, and front contact 80 of relay 2F.

When relay 2F picks up, it opens its back contact 82, thereby deenergizing relay 2CP. After an interval, which is dependent upon the slow release time of relay 2CP, the latter relay drops away. Despite the fact that relay 2CP is somewhat slow to release, it nevertheless drops away before relay 2C drops away because the latter relay has a considerably longer delay time. Because of this, there is no interval of time throughout which relay 2C is dropped away but with relay 2CP still picked up. It is only under the latter conditions that a count can be registered, and therefore this premature dropping away of relay 2CP while relay 2C is still picked up prevents any registration of vehicle V1 and thereby forestalls the normal counting operation.

Eventually, vehicle V1 departs from detection zone 2A. When it does so, repeater relay 2AP drops away. No further circuit operations result from this action.

Still later, vehicle V2 moves farther along so that it occupies detection zone 2A as well as detection zone 2B. Upon its entry into detection zone 2A, the vehicle causes relay 2AP to pick up. When this occurs, capacitor 16 which is normally charged through back contact 33 of relay 2AP, is now connected through front contact 33, front contact 43 of relay 2BP, front contact 64 of relay 2N, and front contact 81 of relay 2F to the winding of relay 2CP. Because of this, relay 2CP is again restored to the picked-up condition.

Now that relay 2CP is again picked up, the stick circuit for relay 2F is opened at back contact 105 so that relay 2F is deenergized. Relay 2F does not drop away immediately upon its deenergization because of its slow release characteristics. However, when this relay does drop away, its front contact 81 opens, thereby deenergizing relay 2CP, which relay then drops away at the end of a brief interval corresponding to its delay time in releasing.

The picking up of relay 2F and its subsequent dropping away in the manner just described has accomplished, in general, two important functions. The first of these, as already mentioned, constituted the opening of the energizing circuit for relay 2CP, thereby causing this relay to drop away ahead of its normal drop-away time, i.e. it caused relay 2CP to drop away before relay 2C had dropped away and therefore prevented the vehicle from being registered since, for this to occur, there must exist briefly the condition that relay 2C is dropped away but with relay 2CP still picked. The picking up of relay 2F has also had the effect of providing an alternate pick-up circuit for relay 2CP thereby permitting this relay to be picked up at the instant the vehicle enters detection zone 2A while zone 2B is still occupied and thus connect capacitor 16 in the pick-up circuit of relay 2CP. Once this occurs, relay 2CP remains energized as the capacitor 16 continues to discharge through its winding. In the meantime, however, relay 2F picks up and opens the circuit connecting capacitor 16 to the winding of relay 2CP so that it drops away. However, there has now existed a predetermined interval of time throughout which relay 2CP is picked up while relay 2C is dropped away, and it is during this interval that a count can be registered as already mentioned.

Eventually, vehicle V2 moves further along through the passageway and vacates detection zone 2B. When this occurs, repeater relay 2BP drops away. The previously described pick-up circuit for relay 2C is then again closed so that relay 2C picks up and also relay 2CP is again energized through front contact 91 of relay 2C.

Nothing further occurs until the second vehicle V2 departs from the detection zone 2A. Relay 2AP then drops away and again interrupts the pick-up circuit for relay 2C so that relay 2C, after an interval dependent upon its slow release characteristics, finally drops away. When it does, its front contact 91 again opens so that relay 2CP becomes deenergized. However, in this interval, prior to the actual releasing of relay 2CP, the condition again obtains wherein relay 2C is dropped away but relay 2CP is yet not dropped away. At such time, a further count is registered as will presently be described in detail in connection with the counting circuits of FIG. 5. Thereafter, a circuit is again completed to pick up the restoration relay 2RS, and, when this happens, the directional relay 2X is restored to its normal picked up condition, after which time the restoration relay 2RS is again dropped away.

Considering now FIG. 6C which shows the movement of a vehicle which partially enters and then reverses its direction, it will be apparent that the first portion of the operation of the count pulse control circuits is identical to that just described in connection with FIG. 6B. Thus, when vehicle V first enters detection zone 2B, relay 2BP picks up and this results in the dropping away of directional relay 2X. When the front of the vehicle has passed into detection zone 2A, relay 2AP picks up; later, when the rear of the vehicle passes out of detection zone 2B, relay 2BP drops away. This results in the picking up of relay 2C through the previously described energization circuit for this relay and this is followed by the picking up of its repeater relay 2CP.

When the vehicle reverses its direction so that its rear portion reenters detection zone 2B, relay 2BP picks up. As before, the then charged capacitor 15 is connected in series with the winding of relay 2F so that this relay picks up. The picking up of relay 2BP has also opened the pick-up circuit for relay 2C so that this relay is deenergized, but it cannot, of course, immediately drop away. The picking up of relay 2F, on the other hand, has opened the pick-up circuit for relay 2CP so that this latter relay will drop away before relay 2C can drop away. Because of this, there does not at any time exist a condition wherein relay 2C is dropped away but relay 2CP is still picked up and because of this no count can be registered for this particular vehicle.

When vehicle V has proceeded in the reverse direction to the point where it vacates zone 2A, relay 2AP drops away. When the vehicle has progressed still further so that it no longer even occupies detection zone 2B, then relay 2BP as well drops away. It should be noted that, with this sequence of relay operations, at no time is capacitor 16, when in the charged condition, connected in series with the winding of relay 2CP, so that relay 2CP cannot be picked up in this way. On the other hand, the dropping away of relay 2BP as just described opens the stick circuit for relay 2F at front contact 42 of relay 2BP so that relay 2F drops away. Another result of the dropping away of relay 2BP is the completion of the pick-up circuit for the restoration relay 2RS. As before, the picking up of this relay permits the restoration of the directional relay 2X, and this latter relay when it is picked up again opens the circuit to relay 2RS so that it is restored to its normal condition.

From this description, it is clear that for the vehicle movements described in FIG. 6C, no vehicle registration occurs, and all the relays are eventually restored to their normal conditions.

Figure 5B:
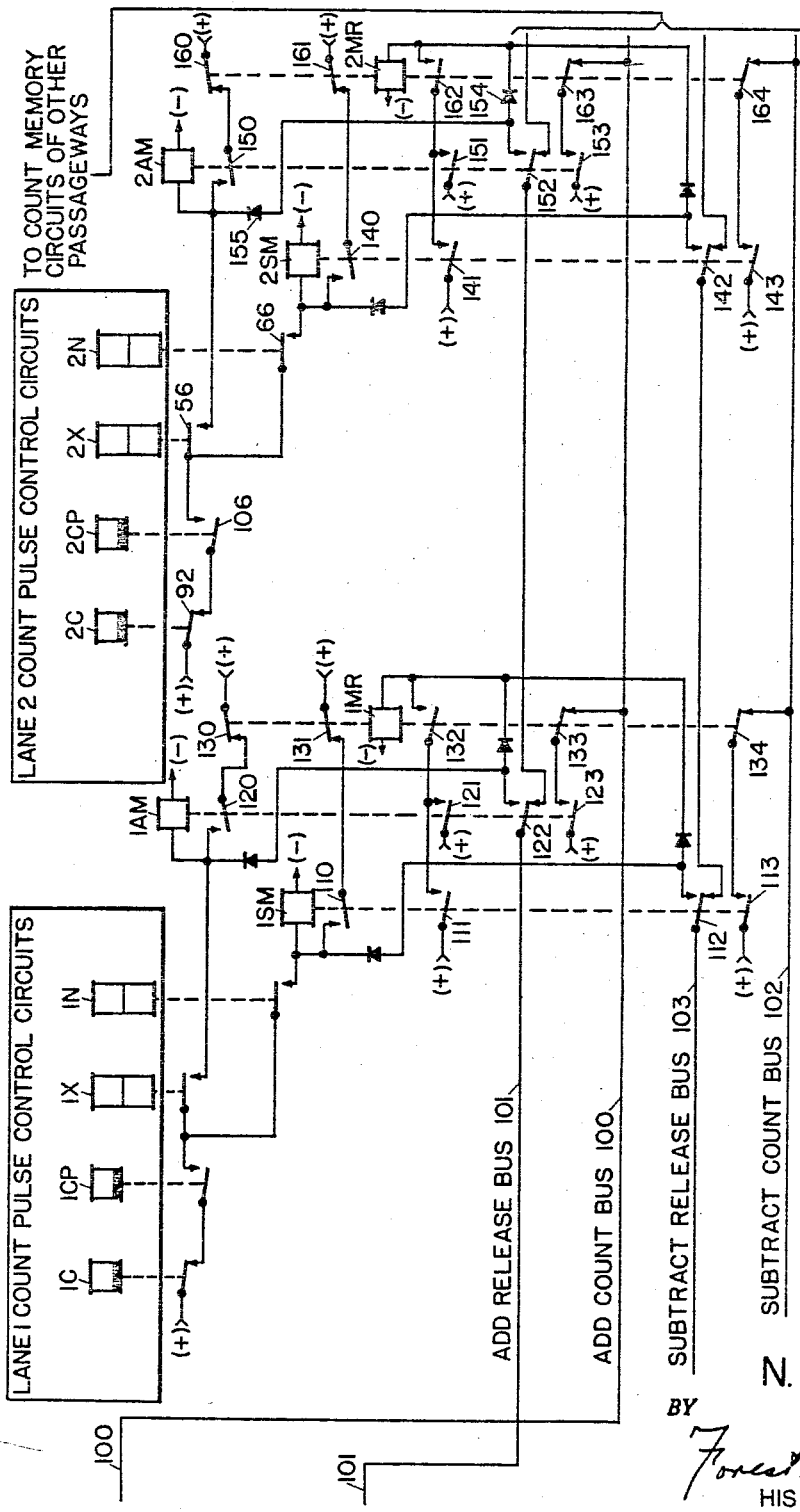

*Counting Circuits—FIGS. 5A and 5B*

The counting circuits of this invention are described in FIGS. 5A and 5B. In FIG. 5B are illustrated, for example, the relays 2C, 2CP, 2X and 2N. These relays and their control circuits are illustrated in FIG. 4 and have already been described in detail. The corresponding relays for lane 1 are also shown in FIG. 5B.

In many applications of the present invention, as where the vehicles entering and leaving a parking garage are to be separately counted in order to indicate the available remaining spaces, there may be more than one passageway for vehicles, and yet it will be desirable to register the vehicles entering and leaving such other passageway on the same counting circuits as are provided for those associated with lane 1 and lane 2. Where such a situation exists, the relays for such other lanes corresponding respectively to the relays 2C, 2CP, 2X and 2N may be connected in exactly the same manner as shown for the last-named group of relays. In this way, any desired number of individual traffic lanes may be coupled to one common totalizing means.

In describing the circuits of FIG. 4, their mode of operation was described in relation to a vehicle traveling along lane 2 and exiting through the passageway. It was stated there that under such circumstances, the relay 2X is dropped away and that there furthermore exists a brief interval during which relay 2C is dropped away but relay 2CP has not yet dropped away. Applying this same hypothetical condition to the counting circuits of FIG. 5B, it can be seen that, under such circumstances, a circuit will be momentarily closed through back contact 92 of relay 2C, front contact 106 of relay 2CP, and back contact 56 of relay 2X to the winding of relay 2AM. Relay 2AM is an add memory relay and, in effect, stores the fact that a count is to be added to the available space totalizer 200 of FIG. 5A. The exiting vehicle results in the addition of an available parking space and thus requires the addition of a count to the totalizer 200. It will, of course, be appreciated that under certain circumstances it might well be desired to subtract a count for every vehicle exiting and to add one for each vehicle entering in order thereby to maintain a running count of the vehicles within the parking area. However, when it is desired to maintain a running count of the spaces available as is assumed here, then the opposite mode of operation should occur.

It will be noted that another relay 2SM is provided and this is a subtract memory relay. Thus, for a vehicle which is entering through the passageway, a circuit is provided to energize this relay through back contact 66 of relay 2N. Whichever of these two relays is energized, it will remain energized through a stick circuit. Thus, a stick circuit is provided for relay 2AM through back contact 160 of memory release relay 2MR and, for relay 2SM, through back contact 161 of this same relay 2MR.

Where the counting circuits for several different lanes are simultaneously attempting to add or subtract counts upon the totalizer 200, it may well occur that a relay such as the relay 2AM will remain energized for some appreciable time interval. In the meantime, there is nothing to prevent the other associated relays such as relay 2SM from also becoming energized. In other words, both relays 2AM and 2SM may be energized at the same time, and will be, if a vehicle has entered and another one has left through lane 2 in fairly rapid succession and before there has been ample opportunity for the first of such relays, relay 2AM, to have been restored to its normal dropped-away condition after registration of its count upon the totalizer 200.

Assuming for the present that only relay 2AM is picked up, a circuit is then completed through front contact 153 of this relay and through back contact 163 of relay 2MR to energize the add count bus 100. The energization of this bus causes energy to be applied through back contact 190 of relay CR and through back contact 180 of relay SC to the winding of the add count relay AC. One result of this is the closure of a circuit to front contact 173 of this relay which energizes the add coil of the totalizer 200 thereby increasing by one count the available space indication provided by this totalizer. At the same time, lamp 205 is momentarily illuminated to indicate that a vehicle has exited through one or more of the lanes which are feeding this counting apparatus.

Another effect of the picking up of relay AC is the opening of back contact 170 of this relay, thereby preventing the subtract count relay SC from picking up at the same time. Contact 180 of relay SC accomplishes a similar function and thus it is impossible for both of these relays to be picked up at the same time.

Still another effect of the picking up of relay AC is the closure of its front contact 171 which thereby energizes relay CR. Relay CR is slow to pick up, however, as denoted by the heavy upper line for the symbol designating this relay and is also provided with slow releasing characteristics as indicated by the heavy base line for its symbol. Therefore, there is an interval after the picking up of relay AC and before the picking up of relay CR when a circuit is completed to energize the add release bus 101 through front contact 172 of relay AC and back contact 192 of relay CR. The energization of bus 101 that results causes energy to be applied through back contact 122 of relay 1AM, front contact 152 of relay 2AM, and rectifier 154 in the forward direction, to the winding of relay 2MR. At the same time, a stick circuit is closed through front contact 152 of relay 2AM and rectifier 155 in the forward direction to maintain relay 2AM energized. Therefore, relay 2AM cannot immediately drop away even if its stick circuit through back contact 160 of relay 2MR is interrupted. Such interruption of the stick circuit does occur at this time because of the picking up of relay 2MR through the circuit described results in the opening of back contact 160.

Shortly thereafter, relay CR picks up, thereby opening its back contact 192 and removing energy from bus 101 so that relay 2AM is then allowed to drop away. The reason for providing the alternate stick circuit through front contact 152 of relay 2AM is to make the dropping away of relay 2AM dependent upon the removal of energy from bus 101. When this is done, it becomes impossible for relay 2AM to drop away and close its back contact 152 at a time when there is still energy on bus 101. If this latter condition were allowed to develop, it would be possible for the energy on bus 101 to feed further to the right and thereby restore an MR relay associated with some other lane. The function of rectifiers 154 and 155 is to prevent a reverse feeding of energy from the stick circuits for the relays 2AM and 2MR to the bus 101.

The operation of the counting circuits when a count is to be subtracted is similar to that just described. Assuming that relay 2SM has been picked up, energy is then applied to subtract count bus 102 from contact 143 of such relay 2SM and back contact 164 of relay 2MR. Relay SC is then picked up and relay CR is energized. For an interval of time after the picking up of relay SC but before relay CR has picked up, energy will be applied to the subtract release bus 103 through front contact 182 of relay SC and back contact 193 of relay CR. This energy on bus 103 will then pick up relay 2MR and this will open the stick circuit to relay 2SM at back contact 161. Relay 2SM will remain energized, however, by the alternate stick circuits through front contact 142 of relay 2SM. Thus, relay 2SM will not actually be permitted to drop away until the energization is removed from bus 103.

If both relays 1AM and 2AM are energized, concurrently, both will cause energy to be applied to the add count bus 100 and such energization will result in the picking up of the add count relay AC so that an additional count will be added to the totalizer 200. When the add release bus 101 is energized, however, only one of these two relays 1AM and 2AM should be released since, with the registration of only one count on totalizer 200, one of the add memory relays should remain energized to store the fact that still another count is to be added. This is readily taken care of in the circuit of FIG. 5B by cascading, in effect, the restoration circuits. More specifically, the energization of the add release bus 101 after the first count has been added to the totalizer can only pick up relay 1MR and not relay 2MR. The reason for this is that front contact 122 of relay 1AM is closed so that a circuit can be completed to enerize relay 1MR and thereby cause relay 1AM to be restored. However, the fact that this back contact 122 is open at this time means that energy cannot be fed further to the right to energize relay 2MR and thereby restore relay 2AM. Since relay 2AM remains energized and also relay 2MR, energy remains on the add count bus 100 so that the second count can be added to the totalizer 200. Energization is again applied to bus 101 at the time of adding the second count so that relay 2MR can this time be picked up through back contact 122 of relay 1AM which is now closed as is also front contact 152 of relay 2AM.

Similar add and subtract memory relays may be cascade-connected to these buses in the same manner as shown for those in lane 1 and lane 2. Where add or subtract memory relays for the different lanes are concurrently picked up, sequential inputs will be applied to the totalizer and also the memory relays for the respective lanes will be restored in sequence.

Having described a bi-directional, dual-lane vehicle registering system as one specific embodiment of this invention, I desire it to be understood that various modifications, adaptations and alterations may be made to the specific form of this invention illustrated in the drawings and described herein without departing from the spirit or scope of this invention.

What I claim is:

1. In a system for directionally detecting vehicles passing along a roadway and sequentially through at least two spaced first and second vehicle detection zones each defined by a respective vehicle detector means and with each said vehicle detector means being distinctively controlled by the passage of a vehicle through the respective detection zone the combination comprising, vehicle registering means governed by both said vehicle detector means for registering the passage of a vehicle in a particular direction as said vehicle while moving in said particular direction sequentially traverses said successive detection zones, said registering means normally registering the passage of said vehicle when said vehicle detector means for the second of said detection zones to be traversed senses that said vehicle has vacated said second detection zone, means distinctively controlled by said vehicle detector for the first detection zone when said first detection zone becomes occupied at a time when said second detection zone is still occupied, said last-named means when in said distinctive condition preventing registration of a first vehicle upon its vacating said second detection zone at a time when first detection zone is occupied by a second vehicle and permitting registration of said first vehicle only provided that thereafter both said detection zones become simultaneously occupied, said last-named means being restored to its normal condition by said vehicle registering means when said first vehicle has been registered, whereby a vehicle reversing its direction even after having vacated said first detection zone is not registered.

2. The invention claimed in claim 1 wherein said last-named means is also restored when both said detector means are restored to their normal non-detecting conditions, whereby said last-named means is restored when a vehicle reverses its direction even after having vacated said first detection zone.

3. The invention claimed in claim 1 wherein said last-named means includes an electromagnetic relay and a capacitor, said capacitor becoming charged when said second detection zone becomes unoccupied, said capacitor being connected by said vehicle detectors for said first and second detection zones to the winding of said relay to actuate said relay when both said first and second detection zones are concurrently occupied, and means for maintaining said relay in its actuation condition as long as said first detection zone remains occupied.

4. The combination of claim 3 and further including means governed by said vehicle detector means for said first and second detection zones to discharge said capacitor if said first detection zone becomes occupied at a time when said second detection zone is still occupied, whereby said relay cannot be actuated in response to a vehicle successively traversing both said detection zones.

5. In a system for selectively registering the passage of a vehicle through a predetermined detection area in accordance with its direction of travel the combination comprising, at least first and second vehicle detectors defining respective first and second detection zones which are traversed sequentially by said vehicle when traveling in a particular direction through said detection area, each said vehicle detector producing a distinctive output throughout the time said vehicle is within the respective detection zone, vehicle registering means, first circuit means normally controlled jointly by said two vehicle detectors when both said vehicle detectors have produced said distinctive output in said particular sequence as said vehicle has first occupied and then vacated said first and second detection zones sequentially for registering the passage of said vehicle in said particular direction on said registering means, second circuit means being operated to a distinctive condition by said first and second vehicle detectors when said first detection zone becomes reoccupied either by said vehicle as a result of a reversal of its direction or by a second immediately following vehicle at a time when said second detection zone is still occupied, said second circuit means controlling said first circuit means to register the passage of said vehicle on said registering means only provided that thereafter both said first and second detection zones become simultaneously occupied, whereby a vehicle count will be registered only provided said vehicle passes entirely through said detection area but not when said vehicle reverses its direction of travel before departing from said detection area.

6. A system for directionally counting vehicles comprising in combination, first and second vehicle detectors defining respective detection zones spaced in the direction of travel of said vehicle and being occupied and then vacated sequentially for each passing vehicle, each said vehicle detector producing a respective output signal when its associated detection zone is occupied by a vehicle, a counter, and means responsive to the output signals of said vehicle detectors for registering on said counter the passage of a vehicle in a particular direction only when said vehicle has in order occupied said first and second zones and thereafter vacated both said zones in the same order, whereby a vehicle reversing its direction after occupying both said zones in order and after vacating the first occupied zone is not registered upon said counter, said means being governed by the successive output signals of said vehicle detectors occurring when two closely-spaced vehicles pass in succession through said detection zones so closely spaced that each of said first and second zones is occupied for at least a time by a different one of said vehicles to register both said vehicles.

7. A system for directionally counting vehicles comprising in combination, first and second vehicle detectors defining respective detection zones spaced in the direction of vehicle travel and being occupied and then vacated in a first sequence for each passing vehicle moving in a particular direction but being occupied and then vacated in a second opposite sequence for each vehicle moving in a second generally opposite direction, each said vehicle detector producing a distinctive output signal when its associated detection zone is occupied by a vehicle, a counter having first and second input means and adding a single count for each signal applied to its first input means and subtracting a single count for each signal applied to its second input means, coupling means responsive to the output signals of said vehicle detectors for applying to the first input means of said counter an input signal to register the passage of said vehicle in said particular direction only when said vehicle has occupied said first and second zones in said first sequence and thereafter vacated both said first and second zones in the same sequence and for applying to said second input means an input signal to thereby register the passage of said vehicle in the opposite direction only when said vehicle has occupied said first and second zones in said second sequence and thereafter vacated both said zones in said second sequence, whereby a vehicle reversing its direction after occupying both said zones in order and after vacating the first-occupied zone is not registered upon said counter, said coupling means being governed by the successive output signals of said vehicle detectors occurring when two vehicles pass in succession through said detection zones in a particular direction so closely spaced that for a time each of said detection zones is occupied by a different one of said two vehicles to apply two time-spaced input signals to said first input means.

8. The invention as defined in claim 7 wherein said coupling means is also governed by the successive output signals of said vehicle detectors occurring when two vehicles pass in succession through said detection zones in a direction generally opposite to said particular direction and so closely spaced that for a time each of said detection zones is occupied by a different one of said two vehicles to apply two time-spaced input signals to said second input means.

9. Apparatus for directionally counting vehicles passing simultaneously either in the same or opposite directions through a multi-lane passageway comprising, first and second vehicle detectors for each lane defining respective detection zones spaced in the direction of travel of said vehicle, each of said vehicle detectors being of the type which includes overhead transmitting and receiving transducers which respectively transmit and receive energy transmitted down toward and reflected from the tops of passing vehicles and including also receiving means differentiating between pavement-reflected and vehicle-reflected energy and producing a distinctive output signal when the respective detection zone is occupied by a vehicle, an add-subtract counter, first and second input means for said counter respectively responsive to input signals applied thereto to add a count for each input signal applied to said first input means and to subtract a count for each input signal applied to said second input means, and means coupled between said vehicle detectors and said first and second input means of said counter to register each vehicle passing through said passageway according to its direction of travel, said coupling means being responsive to the output signals of said spaced vehicle detectors for either of said lanes produced when a vehicle travels in a first direction through said passageway and successively passes through the respective detection zones of that lane in a particular sequence to apply an input signal to said first input means and being also simultaneously responsive to a second vehicle concurrently travelling in a second opposite direction through said passageway and passing through the respective detection zones of the other lane to apply an input signal to said second input means, whereby two vehicle passing concurrently in opposite directions through said passageway cause separate input signal to be applied to both said first and second input means of said counter.

10. Apparatus for directionally counting vehicles passing through a multi-lane passageway comprising, a plurality of vehicle detectors each defining a respective detection zone and producing a distinctive output signal when the respective zone is occupied by a vehicle, said plurality of vehicle detectors being arranged to provide a first row of detection zones including first, second and third spaced detection zones and also a second row including first, second and third spaced detection zones, said first and second rows being spaced in the direction of vehicle travel and each generally transverse to the direction of vehicle travel and with the respective zones of each row being sufficiently closely spaced so that each vehicle travelling through said passageway must occupy at least one and at most two of said detection zones, a counter for counting each vehicle passing through said passageway, means for coupling said vehicle detectors to said counter, said coupling means being responsive to the occupancy of either said first or said second detection zones of either row by a vehicle for applying an input count to said counter only when thereafter both the corresponding first and second detection zones of the other row have been vacated by said vehicle, said coupling means being also responsive to the occupancy of either said second or said third detection zones of either row by a vehicle for applying an input count to said counter only provided that said vehicle has thereafter vacated both the corresponding second and third detection zones of the other row.

11. In a system for registering the passage of vehicles travelling in a particular direction through a passageway the combination comprising, a plurality of vehicle detectors each defining a respective detection zone and producing a distinctive output signal in response to the entry of a vehicle into the respective detection zone, said vehicle detectors being so positioned and directed that the respective detection zones are arranged in successive pairs across said passageway with the first and second detection zones of any pair which are encountered by a vehicle travelling in said particular direction being disposed generally parallel to the direction of vehicle travel and with the lateral spacing between successive pairs of said detection zones across the width of said passageway being sufficiently small to ensure that a vehicle must traverse in order at least the two detection zones of one pair, and directional vehicle registering means governed by said vehicle detectors for registering the passage of a vehicle in said particular direction only when said vehicle has occupied and then vacated the first detection zone of any pair and has also occupied and vacated the second detection zone of the same pair or an immediately adjacent pair.

(References on following page)

References Cited in the file of this patent

UNITED STATES PATENTS

| | | |
|---|---|---|
| 2,482,610 | Burn | Sept. 20, 1949 |
| 2,603,419 | Barker et al. | July 15, 1952 |
| 2,644,150 | Burn | June 30, 1953 |
| 2,678,165 | Burn | May 11, 1954 |
| 2,807,418 | Cunningham | Sept. 24, 1957 |
| 2,866,600 | Cooper et al. | Dec. 30, 1958 |
| 3,105,221 | Schwarz | Sept. 24, 1963 |

FOREIGN PATENTS

| | | |
|---|---|---|
| 468,040 | Great Britain | June 28, 1937 |